United States Patent Office 3,497,428
Patented Feb. 24, 1970

3,497,428
PREPARATION OF ORGANO METALLIC
COMPOUNDS
Richard L. Craig, Edward A. Hunter, and Evan A. Mayerle, Lake Jackson, Tex., assignors to Nalco Chemical Company, Chicago, Ill., a corporation of Delaware
No Drawing. Filed Mar. 28, 1968, Ser. No. 717,043
Int. Cl. B01k 1/00
U.S. Cl. 204—59                    5 Claims

ABSTRACT OF THE DISCLOSURE

A method of preparing organo metallic compounds electrolytically using a sacrificial anode and a Grignard reagent in a specific solvent system comprising tetrahydrofuran and hexamethylphosphoramide.

INTRODUCTION

The present invention is directed to an improved electrolytic process of the type set forth in the disclosure of U.S. 3,312,605. The disclosure of this patent is incorporated herein by reference.

U.S. 3,312,605 teaches the use of specific solvent systems comprising a mixture of tetrahydrofuran and certain diethers of polyglycols for electrolyzing Grignard reagents. This patent must be viewed in the light of additional prior art such as set forth in U.S. 3,007,858, U.S. 3,118,825 and U.S. 3,155,602.

While the solvent systems set forth in U.S. 3,312,605 have advanced the art of electrolytically reacting certain Grignard reagents with a sacrificial anode to produce organo metallic compounds, it is the purpose of this invention to allow such reactions to be even more efficiently conducted.

ELECTROLYSIS OF GRIGNARD COMPOUNDS

The term "Grignard reagent" as used herein refers to the product obtained by reacting approximately equimolar proportions of a compound having the formula RX and Mg according to the equation:

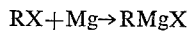

$$RX + Mg \rightarrow RMgX$$

in which R represents the organic radical, X represents the halogen atom of the Grignard reagent, and Mg is the conventional symbol for magnesium. The radical R can be, for example, methyl, ethyl, propyl, isopropyl, butyl and higher homologues, phenyl, benzyl, and the like. The radical X can be, for example, chlorine, bromine or iodine.

The principal reactions contemplated by the invention are those in which a Grignard reagent is electrolyzed in the presence of a sacrificial lead anode and in which R is methyl and/or ethyl, and X is chlorine. Thus, tetramethyl lead can be made in accordance with the invention by electrolyzing methyl magnesium chloride, using a lead anode, and tetraethyl lead can be made in accordance with the invention by electrolyzing ethyl magnesium chloride, using a lead anode.

The invention also contemplates the manufacture of mixed alkyl lead compounds, such as triethylmethyl lead, diethyldimethyl lead and ethyltrimethyl lead, usually in the form of mixtures with tetraethyl lead and tetramethyl lead by using as the electrolyte mixtures of methyl magnesium chloride and ethyl magnesium chloride.

Specific examples of other Grignard reagents are ethyl magnesium bromide, isopropyl magnesium chloride, isopropyl magnesium bromide, butyl magnesium chloride, butyl magnesium bromide, amyl magnesium bromide, amyl magnesium chloride, and higher alkyl homologues.

Similarly, the phenyl magnesium chloride, phenyl magnesium bromide or mixtures of phenyl and ethyl magnesium chloride, or mixtures of phenyl and ethyl magnesium bromide, or mixtures of phenyl and methyl magnesium chloride, or mixtures of phenyl and methyl magnesium bromide can be electrolyzed to produce other organic lead compounds containing the phenyl radical or both the phenyl and ethyl radicals, or both the phenyl and methyl radicals, or both the phenyl and other alkyl radicals in case a higher alkyl magnesium halide is substituted for the ethyl magnesium halide or the methyl magnesium halide. In a similar manner benzyl magnesium chloride can be employed as an electrolyte.

The cathode may be composed of a suitable conducting but non-reactive material, such as platinum, stainless steel, ordinary steel, graphite, or other conducting material, which does not dissolve in the electrolyte. In some cases the cathode may be composed of the same material as the anode. Thus, both the cathode and the anode can be composed of lead. It is preferable, however, that the anode be composed of lead and the cathode of steel.

The process is preferably carried out by adding an extraneous organic alkyl halide to the electrolyte during the electrolysis or by adding two or more organic halides to an electrolyte containing either a single Grignard reagent or a mixture of Grignard reagents. Thus, by adding two different alkyl halides to the Grignard reagent dissolved in the organic solvent, for example, by adding methyl chloride and ethyl chloride to a Grignard reagent consisting initially of methyl magnesium chloride dissolved in a mixture of tetrahydrofuran and the organic ether, as described in U.S. 3,312,605, organo lead compounds are obtained containing both methyl and ethyl radicals linked to the metallic lead atom. Similarly, if mixtures of methyl chloride and tertiary butyl chloride are used as the extraneous halides, the resultant compounds contain both ethyl groups and tertiary butyl groups linked to the lead atom.

The mixture of organic solvents comprising the tetrahydrofuran constituent and organic diether serve many purposes. Firstly, the tetrahydrofuran component unexpectedly increases the conductivity of the cell electrolyte to a point where reactivity is increased several fold. Thus, the total yield of organic lead compound over extended periods of time can be greatly increased. Yet such increase in efficiency is achieved without sacrifice of yield.

While the tetrahydrofuran organic solvent thus promotes increased conductivity, and overall yield per unit time, it has been determined that its use conjointly with the above defined organic ether solvents overcomes difficulties that arise when the tetrahydrofuran is used alone.

OBJECTS OF THE INVENTION

Based on the above it is the object of the invention to provide an improved solvent system for the conducting of electrolytic reactions involving the electrolysis of Grignard reagents with sacrificial anodes.

Another object of the invention is to provide a solvent system having improved electrical characteristics over those disclosed in U.S. 3,312,605.

Other objects will appear hereinafter.

THE INVENTION

In accordance with the invention it has been found that organo metallic compounds may be prepared by electrolyzing with a sacrificial anode an anhydrous solution of a Grignard reagent in a specific mixed solvent system. The specific mixed solvent system comprises 20–80% by weight of a tetrahydrofuran and 80–20% by weight of hexamethylphosphoramide. The tetrahydrofuran is preferably used in excess of 60% by weight and should be used for maximum effectiveness at a concentration ranging between 65–75% by weight.

The described solvent mixtures with tetrahydrofuran can be employed in conjunction with still other solvents including organic ether solvents, such as, for example, the dimethylether or the diethylether or the dipropylether of diethylene glycol, the dipropylether of dipropylene glycol, the dibutylether of diethylene glycol, or the dimethylether of dipropylene glycol, or the hexylethylether of diethylene glycol. Also usable are the solvents of U.S. 3,312,605.

Good results are obtained by employing the above described organic solvent system in conjunction with aromatic hydrocarbons such as toluene, benzene, etc. Some of these latter aromatic substances, such as benzene, assist in preventing the formation of several liquid phases. Others such as toluene serve as stabilizers, especially in the recovery of tetramethyl lead. The use of these substances for specific purposes does not constitute a part of this invention. It suffices to note that the addition of such aromatic hydrocarbons to the electrolyte does not substantially alter the results obtained by the practice of this invention.

The process is normally carried out at temperatures above the freezing point of the solution and below the boiling points of the solvent system. Higher current densities tend to heat the solution and cooling may be applied, if necessary. In general, good results are obtained at temperatures within the range of 20° C. to 65° C. and in the preparation of the tetramethyl lead and tetraethyl lead temperatures within the range of 30° C. to 50° C. are preferably employed.

The pressures used are normally sufficient to maintain the liquid phase with the particular solvent and temperature conditions employed. According to one method of operating the process, extraneous organic halide such as, for example, methyl chloride and/or ethyl chloride is added to the electrolyte and superatmospheric pressures normally prevail in the reaction cell. These pressures will vary, depending upon the quantity of the organic halide and the type of solvent, but in general, the process will be operated at pressures less than 5 atmospheres.

One way of carrying out the process is to electrolyze the electrolyte until the Grignard reagent therein is substantially exhausted. Another way is to separate a part of the electrolyte and recover at least a part of the desired Grignard reagent to the cell. The present invention is not particularly concerned with the manner in which the product is recovered.

The type of electrolytic cell used is also subject to variation and does not constitute a part of this invention. A suitable type of cell is disclosed in U.S. Patent 3,141,841.

EXAMPLES

The invention will be further illustrated but is not limited by the following examples in which the quantities are stated in parts by weight unless otherwise indicated.

Example I

Ethyl Grignard in tetrahydrofuran was diluted to a molarity of 1.56 with anhydrous hexamethylphosphoramide, resulting in a solvent ratio of 58/42 tetrahydrofuran/hexamethylphosphoramide. This Grignard solution was then electrolyzed in a 100 cc. laboratory pipe cell with a lead anode at 1.0 amp and under otherwise normal conditions for this cell.

Example II

The identical experiment was conducted as set forth in Example I with the exception that the diethyl ether of tetraethylene glycol was substituted for hexamethylphosphoramide.

The results of the experiments set forth in Examples I and II are set forth in the table below:

TABLE

| | Example I | Example II |
|---|---|---|
| Amperage | 1.0±0.1 | 1.0±0.1 |
| Volts, minimum | 6.0 | 9.0 |
| Volts, maximum | 15.0 | 20.0 |
| Current density, maximum (amps/ft.²/volt) | 1.67 | 1.11 |
| Current density, minimum (amps/ft.²/volt) | 0.67 | 0.50 |
| Current efficiency, percent | 150 | 144 |
| T., °F | 80–84 | 76–88 |
| Pressure, p.s.i.g | 6–12 | 5–16 |
| Flow rate, cc./min | 500±50 | 500±50 |

The table shows that the tetrahydrofuran-hexamethylphosphoramide solvent system showed an improved current efficiency over the tetrahydrofuran glycol ether system. This increased current efficiency allows the process of Grignard electrolysis to be conducted more economically, thereby resulting in an overall improved process.

The compound hexamethylphosphoramide as used in the specification and claims has the following formula:

The invention is hereby claimed as follows:

1. A process for preparing organo metallic compounds which comprises electrolyzing, using a sacrificial anode, an anhydrous solution of a Grignard reagent in a mixed solvent comprising from 20–80% by weight of tetrahydrofuran and 80–20% by weight of hexamethylphosphoramide.

2. A process as claimed in claim 1 in which the proportion of tetrahydrofuran in said mixed solvent is in excess of 60% by weight.

3. A process as claimed in claim 1 in which the proportion of tetrahydrofuran in said mixed solvent is in excess of 60% and not more than 75% by weight.

4. A process as claimed in claim 1 in which the sacrificial anode is lead and the Grignard reagent is a methyl Grignard reagent.

5. A process as claimed in claim 1 in which the sacrificial anode is lead and the Grignard reagent is an ethyl Grignard reagent.

References Cited

UNITED STATES PATENTS 3,197,392  7/1965  Silversmith et al. _____ 204—59
3,234,112  2/1966  Braithwaite _____ 204—59

HOWARD S. WILLIAMS, Primary Examiner